United States Patent [19]
Takano et al.

[11] Patent Number: 6,114,839
[45] Date of Patent: Sep. 5, 2000

[54] BATTERY CHARGING APPARATUS WITH ERROR DETECTION

[75] Inventors: Nobuhiro Takano; Kenrou Ishimaru; Toshio Mizoguchi; Shigeru Moriyama, all of Hitachinaka; Shigeru Shinohara, Mito, all of Japan

[73] Assignee: Hitachi Koki Co., Ltd., Tokyo, Japan

[21] Appl. No.: 09/190,268

[22] Filed: Nov. 13, 1998

[30] Foreign Application Priority Data

Nov. 20, 1997 [JP] Japan .................................. 9-319816
Nov. 28, 1997 [JP] Japan .................................. 9-327816

[51] Int. Cl.[7] .................................................. H02J 7/00
[52] U.S. Cl. ............................................. 320/150; 320/153
[58] Field of Search .................................. 320/150, 153, 320/151

[56] References Cited

U.S. PATENT DOCUMENTS

| | | | |
|---|---|---|---|
| 3,852,652 | 12/1974 | Jasinski | 320/150 |
| 4,755,735 | 7/1988 | Inakagata | 320/150 |
| 5,477,127 | 12/1995 | Shiojima et al. | 320/150 |
| 5,493,199 | 2/1996 | Koenck et al. | 320/152 |
| 5,514,946 | 5/1996 | Lin et al. | 320/150 |
| 5,548,201 | 8/1996 | Grabon et al. | 320/150 |
| 5,563,494 | 10/1996 | Cuesta et al. | 320/150 |
| 5,621,302 | 4/1997 | Shinohara | 320/153 |
| 5,642,032 | 6/1997 | Kokuga | 320/152 |
| 5,677,615 | 10/1997 | Takano et al. | |
| 5,686,815 | 11/1997 | Reipur et al. | 320/116 |
| 5,698,967 | 12/1997 | Baer et al. | 320/152 |
| 5,744,937 | 4/1998 | Cheon | 320/150 |
| 5,864,224 | 1/1999 | Takechi et al. | 320/150 |
| 5,886,527 | 3/1999 | Ito | 320/150 |

FOREIGN PATENT DOCUMENTS

| | | |
|---|---|---|
| 62-193518 | 8/1987 | Japan. |
| 2-246739 | 10/1990 | Japan. |
| 3-34638 | 4/1991 | Japan. |

*Primary Examiner*—Peter S. Wong
*Assistant Examiner*—Pia Tibbits
*Attorney, Agent, or Firm*—Pollock, Vande Sande & Amernick

[57] ABSTRACT

A charging circuit generates a charging current from an ac supply which is supplied to a secondary battery in a battery package through first terminals. A second terminal receives a temperature detection signal from a thermistor on the secondary battery. A value of the temperature detection signal is sampled every predetermined interval. A memory stores the sampled value. A difference between the sampled value and the value from the memory is obtained, as well as the temperature decrease value between the sampled value and the value stored, when it applies. An error signal is generated when the difference is higher than a predetermined value and the operator is alarmed and informed of the error. The difference may be obtained between the sampled value and the value one-cycle-previously-sampled value from the memory, between the sampled value and a minimum of the sampled values, or between the sampled value and a charging start value of the sampled value. The thermistor is supplied with a supply voltage through a switch and an error condition caused by leakage of the electrolyte from the battery is detected when the voltage at the second terminal is higher than the predetermined value, the charging current generation circuit is controlled to stop generating the charging current.

7 Claims, 8 Drawing Sheets

BATTERY CHARGING APPARATUS WITH ERROR DETECTION

BACKGROUND OF THE INVENTION

1. Field of the Invention

This invention relates to a battery charging apparatus with error detection.

2. Description of the Prior Art

A battery charging apparatus for charging a secondary battery with control by a thermal sensitive element is known. Japanese patent application provisional publication Nos. 62-193518, 2-246739, and Japanese utility model application provisional publication No. 3-34638 disclose such charging apparatus, wherein a full charge condition is detected when a temperature gradient at a battery is higher than a predetermined value. U.S. Pat. No. 5,677,615 discloses a temperature detecting section.

SUMMARY OF THE INVENTION

The aim of the present invention is to provide a superior battery charging apparatus.

According to the present invention, a first battery charging apparatus is provided. In the first battery charging apparatus, a charging current generation circuit generates a charging current from an ac supply. First terminals supply the charging current to a secondary battery to be charged included in a battery package. The battery package further includes a thermal sensitive element adjacent to the battery which generates a temperature detection signal indicative of a temperature of the battery. A second terminal is provided to receive the temperature detection signal. A sampling circuit periodically samples a value of the temperature detection signal every predetermined interval. A memory responsive to the sampling circuit stores the sampled value. An error condition is judged when the difference between the sampled value and the value from the memory is higher than a predetermined value. The charging current generation circuit stops generating the charging current during the error condition.

The first battery charging apparatus may further include an alarming circuit responsive to the error condition for alarming and informing an operator of the error condition when the difference is higher than the predetermined value.

In the first battery charging apparatus, the difference is obtained between the sampled value and the one-cycle-previously-sampled value from the memory.

In the first battery charging apparatus may further detect a minimum of periodically sampled values of the temperature of the battery using the memory and the difference is obtained between the sampled value and the minimum.

In the first battery charging apparatus, the value of the temperature detection signal at start of charging is stored in the memory as a start value in response to start of generating the charging current and the difference is obtained between the sampled value and the start value. Therefore, in the first battery charging apparatus, the error condition due to leakage of an electrolyte from the battery during charging is detected and reported and charging is stopped.

According to the present invention, a second battery charging apparatus is provided. In the second battery charging apparatus, a charging current generation circuit generates a charging current from an ac supply. First terminals supply the charging current to a secondary battery to be charged included in a battery package. The battery package further includes a thermal sensitive element generating a temperature detection signal indicative of a temperature of the battery. A second terminal is provided to receive the temperature detection signal. A charging control circuit controls the charging current generation circuit in accordance with the temperature detection signal. The second terminal supplies a supply voltage for generating the temperature detection signal through a switch and a resistor to the thermal sensitive element. When a sampling circuit samples the temperature detection signal, the sampling circuit turns on the switch. Error detection is effected by turning off the switch, during turning off of the switch, detecting a voltage at the second terminal which may be developed by charging the secondary battery, comparing the voltage at the second terminal with a predetermined value, and judging an error condition when the voltage is higher than the predetermined value. The charging current generation circuit is controlled to stop generating the charging current when the voltage is higher than the predetermined value.

The second battery charging apparatus may further include an alarming circuit responsive to the error condition for alarming and reporting to an operator the error condition when the voltage is higher than the predetermined value. Therefore, in the second battery charging apparatus, the error condition of leakage from the charging current, or the voltage of the positive electrode to the second terminal due to leakage of an electrolyte from the battery during charging, is detected and reported and charging is stopped.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

First Embodiment

Figure 1:
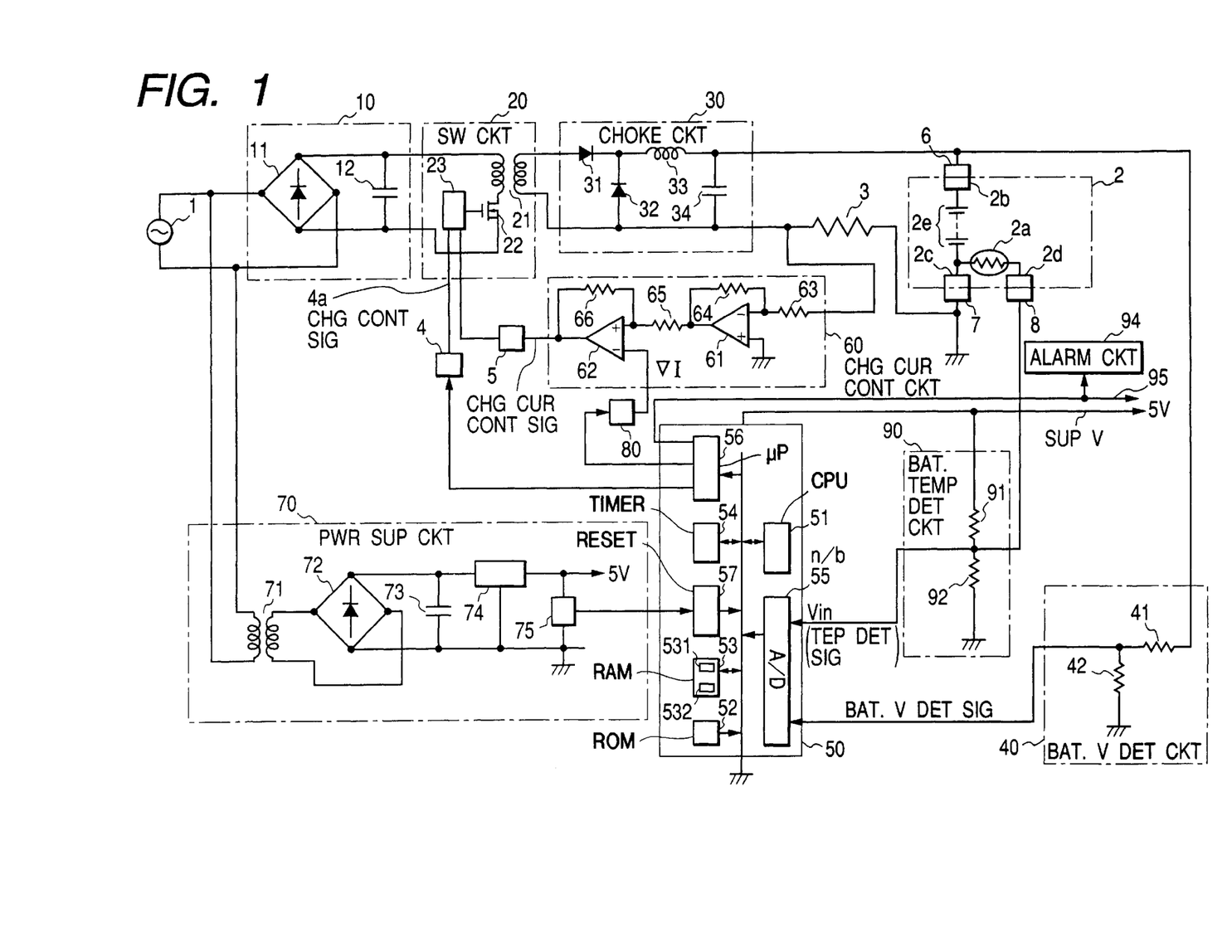
FIG. 1 is a block diagram of a battery charging apparatus of a first embodiment.

FIG. 1 is a block diagram of a battery charging apparatus of a first embodiment.

The battery charging apparatus of the first embodiment includes a dc power supply 10 for receiving an ac power and generating a dc current. A switching circuit 20 generates a charging current of a value is controlled, and a choke circuit 30 rectifies and smoothes the charging current from the switching circuit 20 and supplies the smoothed charging current to a battery package 2 through terminals 6 and 7. A current detection resistor 3 detects a value of the charging current through the battery package 2, and a charging current control circuit 60 responsive to the current detection resistor 3 and a charging reference value VI generates a current control signal supplied to the switching circuit 20. A power supply circuit 70 generates a supply voltage of five volts. A microprocessor battery voltage detection circuit 40 connected to the terminal 6 supplies a battery voltage signal to an a/d converter 55 in the microprocessor 50. A terminal 8 connected to a thermistor 2a in the battery package 2, and a battery temperature detection circuit 90 supplies a temperature detection signal to the a/d converter 55. A charging current setting circuit 80 sets the charging reference value VI to the charging current control circuit 60. A photo-coupler 4 supplies a charging control signal 4a from the output port 56 to a PWM circuit 23 in the switching circuit 20, and an alarming circuit 94 alarms and reports to the operator an occurrence of leakage of the battery.

The dc power supply 10 includes a bridge rectifier 11 and a capacitor 12. The switching circuit 20 includes a high frequency transformer 21, a MOSFET 22 for switching the circuit connected to the high frequency transformer 21, and the PWM control circuit 23 for controlling the MOSFET 22 in accordance with the charging control signal 4a from the photo-coupler 4 and the current control signal from the charging current control circuit 60 via a photo-coupler 5. The choke circuit 30 includes diodes 31 and 32, a choke coil 33, and a smoothing capacitor 34.

The battery package 2 includes a terminal 2b to be connected to the terminal 6 for receiving the charging current. A terminal 2c to be connected to the terminal 7 which is connected to the ground and the current detection resistor 3. A plurality of secondary batteries 2e, are connected together the most positive terminal of the secondary batteries being connected to the terminal 2b, and the most negative terminal of the secondary batteries being connected to the terminal 2c. A terminal 2d is to be connected to the terminal 8, and a thermistor 2a has one end is connected to the most negative terminal of the batteries 2e, and the other end is connected to the terminal 2d, wherein the thermistor 2a is in contact with the secondary battery 2e or adjacent to the secondary battery 2e.

The temperature detection circuit 90 includes dividing resistors 91 and 92, wherein one end of the resistor 91 is connected to the supply voltage of five voltage and the other end is connected to one end of the resistor 92 of which the other end is connected to the ground. The junction point between the resistors 91 and 92 is connected to the terminal 8 and the a/d converter 55. The thermistor 2a has a negative resistance and conducts a temperature detection current from the supply voltage of five volts through the resistor 91, terminals 8, 2d, 2c, and 7 to the ground in accordance with the temperature of the batteries 2e. The temperature detection circuit 90 supplies the temperature detection signal to the a/d converter 55.

The battery voltage detection circuit 40 includes resistors 41 and 42 and supplies the battery voltage detection signal to the microprocessor 50. The microprocessor 50 controls the charging current setting circuit 80 to set the charging reference value VI to the charging current control circuit 60.

The charging current control circuit 60 includes amplifier 61 for amplifying the current detection signal from the current detection resistor 3 and an amplifier 62 for taking the difference between the amplified current detection signal and the charging reference value VI from the current setting circuit 80, and generating a charging current control signal. The PWM circuit 23 controls the charging current by the pulse width modulation in accordance with the charging current control signal corresponding to the difference obtained by the amplifier 62.

The photo-coupler 4 also controls the PWM circuit 23 to stop and start charging in response to the microprocessor 50.

The microprocessor 50 includes a CPU 51, a ROM 52, a RAM 53, a timer 54, the a/d converter 55, the output port 56, and a reset input port 57. The RAM 53 includes battery voltage storing area 531 and a detected temperature value storing area 532.

The power supply circuit 70 includes a transformer 71, a bridge rectifier 72, a capacitor 73, a voltage regulator 74, and a resetting circuit 75 for power-on resetting.

Figure 2:
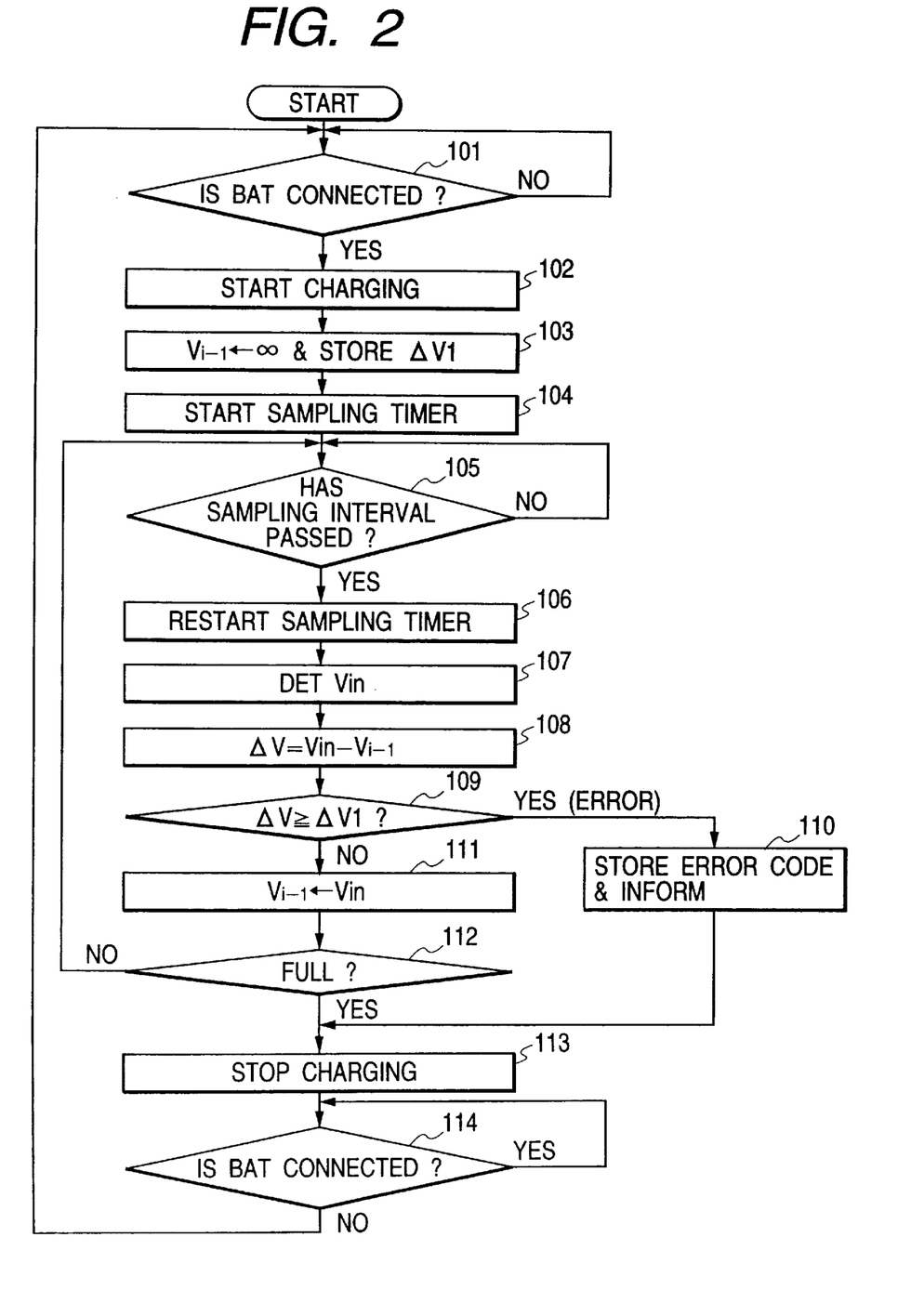
FIG. 2 depicts a flow chart showing the operation of the first embodiment.

FIG. 2 depicts a flow chart showing the operation of the battery charging apparatus of the first embodiment.

In response to the resetting circuit 75, the microprocessor 50 initializes the output port 56 and waits until the battery package 2 connected in step 101.

When the battery package 2 is connected, the microprocessor 50 starts charging in step 102 by setting a charging current reference value VI to the amplifier 62 to start charging the battery package 2 at a charging current I. The charging current control circuit 60 obtains the difference between the value of the charging current from the charging current detection resistor 3 and the charging current reference value VI and supplies it as feedback to the PWM control circuit 23. That is, when the detected charging current is higher than the charging current reference value VI, the pulse width is relatively shortened by PWM circuit 23 and when the charging current is lower than the charging current reference value VI, the pulse width is made relatively long by the PWM circuit 23 to keep the charging current constant.

Then, the microprocessor 50 sets a predetermined initial value as one-sampling-interval-prior value $V_{1-1}$ and a predetermined value $\Delta V1$ to be compared with the sampled temperature detection signal Vin in step 103. In step 104, the microprocessor 50 starts the timer 54 as the sampling timer. Then, the microprocessor 50 checks the sampling timer 54 to judge whether the sampling interval $\Delta t$ has passed. If the sampling interval $\Delta t$ has passed, the microprocessor 50 restarts the sampling timer 54 in step 106. The microprocessor 50 detects the temperature detection signal Vin in step 107. The microprocessor 50 obtains a difference $\Delta V$ between the temperature detection signal Vin and the initial value of the one-interval-prior voltage $V_{1-1}$ in step 108.

The microprocessor 50 compares the difference $\Delta V$ with the predetermined value $\Delta V1$ in step 109. If the difference $\Delta V$ is equal to or higher than the predetermined value $\Delta V1$, the microprocessor 50 stores the corresponding error code and alarms and informs the operator of the error condition by the alarming circuit 94, such as an LED, in step 110. The error code may be outputted at an output 95. Then, the microprocessor 50 controls the switching circuit 20 to stop charging in step 113. In the following step 114, the microprocessor 50 detects whether the battery package 2 is connected by checking the battery voltage by the battery voltage detection circuit 40. If the battery package 2 is removed, processing returns to step 101.

In step 109, if the difference $\Delta V$ is lower than the predetermined value $\Delta V1$, the microprocessor 50 stores the detection voltage Vin in step 111 which is used in the next processing in step 108 as the one-sampling-interval-prior voltage $V_{1-1}$. In the following step 112, the microprocessor 50 Judges whether the batteries 2e have been fully charged. If the batteries 2e is not fully charged, processing returns to step 105.

In step 112, if the batteries 2e have been fully charged, the microprocessor 50 controls the switching circuit 20 to stop charging in step 113 by controlling the PWM circuit 23. In the following step 114, the microprocessor 50 detects whether the battery package 2 is disconnected, that is, removed. If the battery package 2 is removed, processing returns to step 101.

When the circumference temperature is lower than the battery temperature, there is a possibility that in step 108, $\Delta V$ is positive. Therefore, the $\Delta V1$ is determined in accordance with the sampling interval $\Delta t$, the charging current value I, a type of the battery, and the difference between the battery temperature and the circumference temperature.

The fully charged condition is detected in various methods. For example, $\Delta T$ detection method is known. That is, the fully charged condition is detected when the temperature rise from the start of charging exceeds a predetermined value. Moreover, $\Delta T/\Delta t$ detection method is known. That is, the fully charged condition is detected when a temperature gradient at the battery is higher than a predetermined value.

In this embodiment, $\Delta V$ is detected between the present temperature detection signal Vin and the one-sampling-interval-prior-temperature detection signal $V_{1-1}$. However, it is also possible to detect $\Delta V$ between the present detection voltage Vin and the two-sampling-interval-prior detection voltage $V_{1-2}$.

Figure 5:
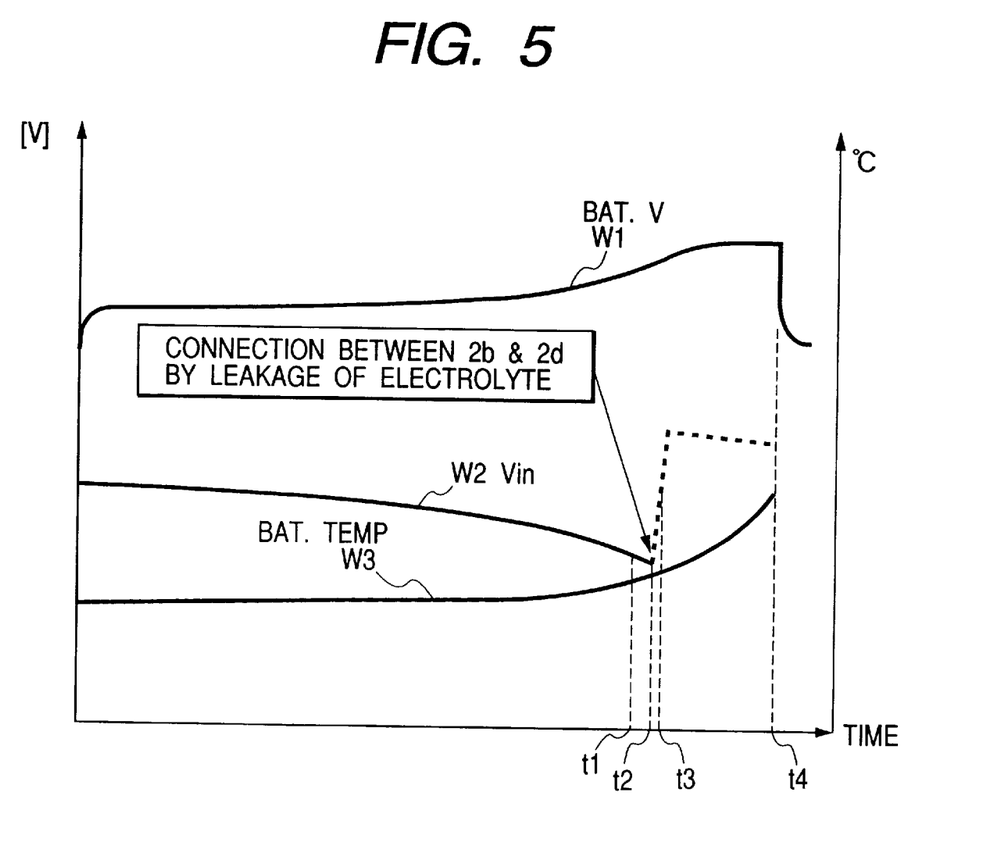
FIG. 5 is graphical drawing of the first embodiment showing the charging operation.

FIG. 5 is graphical drawing of the first embodiment showing the charging operation.

If there is no trouble, during charging, the battery voltage and the battery temperature increase with charging as shown by waveforms W1 and W3. When the completion condition of charging is detected, charging is completed at timing t4 as shown. On the other hand, the voltage value of the temperature detection signal Vin decreases with charging, that is, with increase in the battery temperature as shown waveform W2 before timing t2. However, during charging, if there is leakage between the terminal 2b or a positive electrode of the battery and the terminal 2d or 8 or a lead of the thermistor 2a at timing t2, the battery voltage leaks to the terminal 2d and the temperature detection signal Vin increases after the timing t2. The microprocessor 50 detects the increase in the voltage value of the temperature detection signal Vin from the difference between the voltage values at timings t1 and t3, which means the error condition. Then, the microprocessor 50 stops charging as mentioned above.

Second Embodiment

Figure 3:
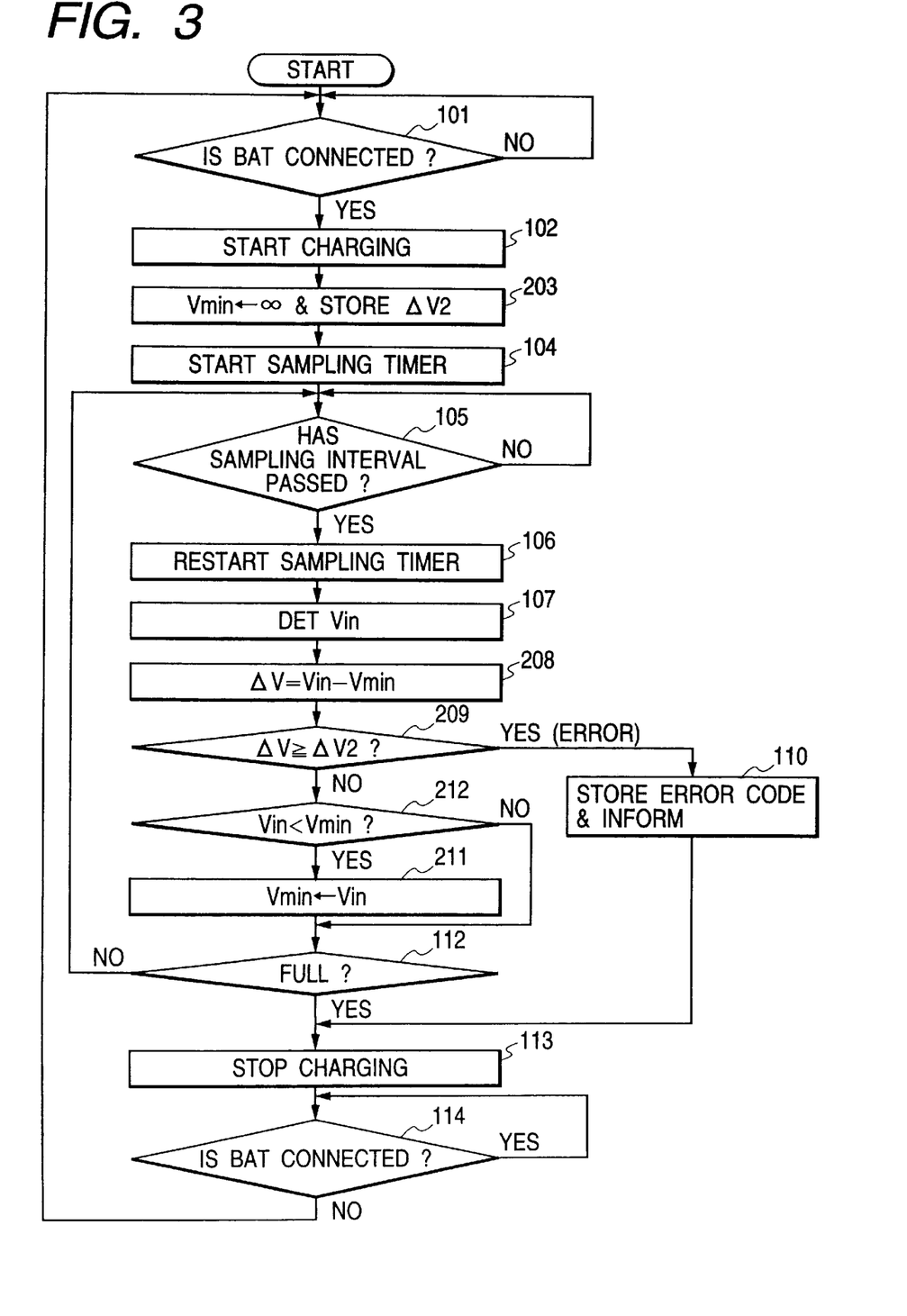
FIG. 3 depicts a flow chart showing the operation of a second embodiment.

FIG. 3 depicts a flow chart showing an operation of a battery charging apparatus of a second embodiment.

The structure of the second embodiment is substantially the same as that of the first embodiment. The difference is that $\Delta V$ is detected between the present temperature detection signal Vin and the minimum value among the temperature detection signal previously sampled. That is, step 212 is added and steps 203, 208, 209, 211 respectively replace steps 103, 108, 109, and 111.

In response to the resetting circuit 75, the microprocessor 50 initializes the output port 56 and waits for connection of the battery package 2 in step 101.

When the battery package 2 is set, the microprocessor 50 starts charging in step 102 by setting a charging current reference value VI to the amplifier 62 to charge the battery package 2 at a charging current I. The charging current control circuit 60 obtains the difference between the value of the charging current from the charging current detection resistor 3 and the charging current reference value VI and supplies it as feedback to the PWM control circuit 23. That is, when the detected charging current is higher than the charging reference value VI, the pulse width is relatively shortened by PWM circuit 23 and when the charging current is lower than the charging current reference value VI, the pulse width is made relatively long by the PWM circuit 23 to keep the charging current constant.

Then, the microprocessor 50 sets a predetermined initial value as a minimum value Vmin of the temperature detection signal and a predetermined value $\Delta V2$ to be compared with the sampled temperature detection signal Vin in step 203. In step 104, the microprocessor 50 starts the timer 54 as the sampling timer. Then, the microprocessor 50 checks the sampling timer 54 to Judge whether the sampling interval $\Delta t$ has passed. If the sampling interval $\Delta t$ has passed, the microprocessor 50 restarts the sampling timer 54 in step 106. The microprocessor 50 detects the temperature detection signal Vin in step 107. The microprocessor 50 obtains a difference $\Delta V$ between the temperature detection signal Vin and the minimum value Vmin in step 208.

The microprocessor 50 compares the difference $\Delta V$ with the predetermined value $\Delta V2$ in step 209. If the difference $\Delta V$ is equal to or higher than the predetermined value $\Delta V2$, the microprocessor 50 Judges the error condition, stores the corresponding error code and informs the operator of the error condition, by the alarming circuit 94, that is, there is leakage in the battery 2e, in step 110. The error code may be outputted at an output 95. Then, the microprocessor 50 controls the switching circuit 20 to stop charging in step 113. In the following step 114, the microprocessor 50 detects whether the battery package 2 is connected. If the battery package 2 is removed, processing returns to step 101.

In step 209, if the difference $\Delta V$ is lower than the predetermined value $\Delta V2$, the microprocessor 50 compares the voltage value of the temperature detection signal Vin with the minimum Vmin of the temperature detection signal in step 212. If the voltage value of the temperature detection signal Vin is smaller than the minimum Vmin of the temperature detection signal, the microprocessor 50 stores, in step 211, the voltage value of the temperature detection signal Vin as the minimum Vmin of the temperature detection signal which is used in the following processing in step 208. If the voltage value of the temperature detection signal Vin is not smaller than the minimum Vmin of the temperature detection signal in step 212, processing directly proceeds to step 112.

In the following step 112, the microprocessor 50 judges whether the batteries 2e have been fully charged. If the batteries 2e is not fully charged, processing returns to step 105.

In step 112, if the batteries 2e have been fully charged, the microprocessor 50 controls the switching circuit 20 to stop charging in step 113 by controlling the PWM circuit 23. In the following step 114, the microprocessor 50 detects whether the battery package 2 is disconnected. If the battery package 2 is removed, processing returns to step 101.

Third Embodiment

Figure 4:
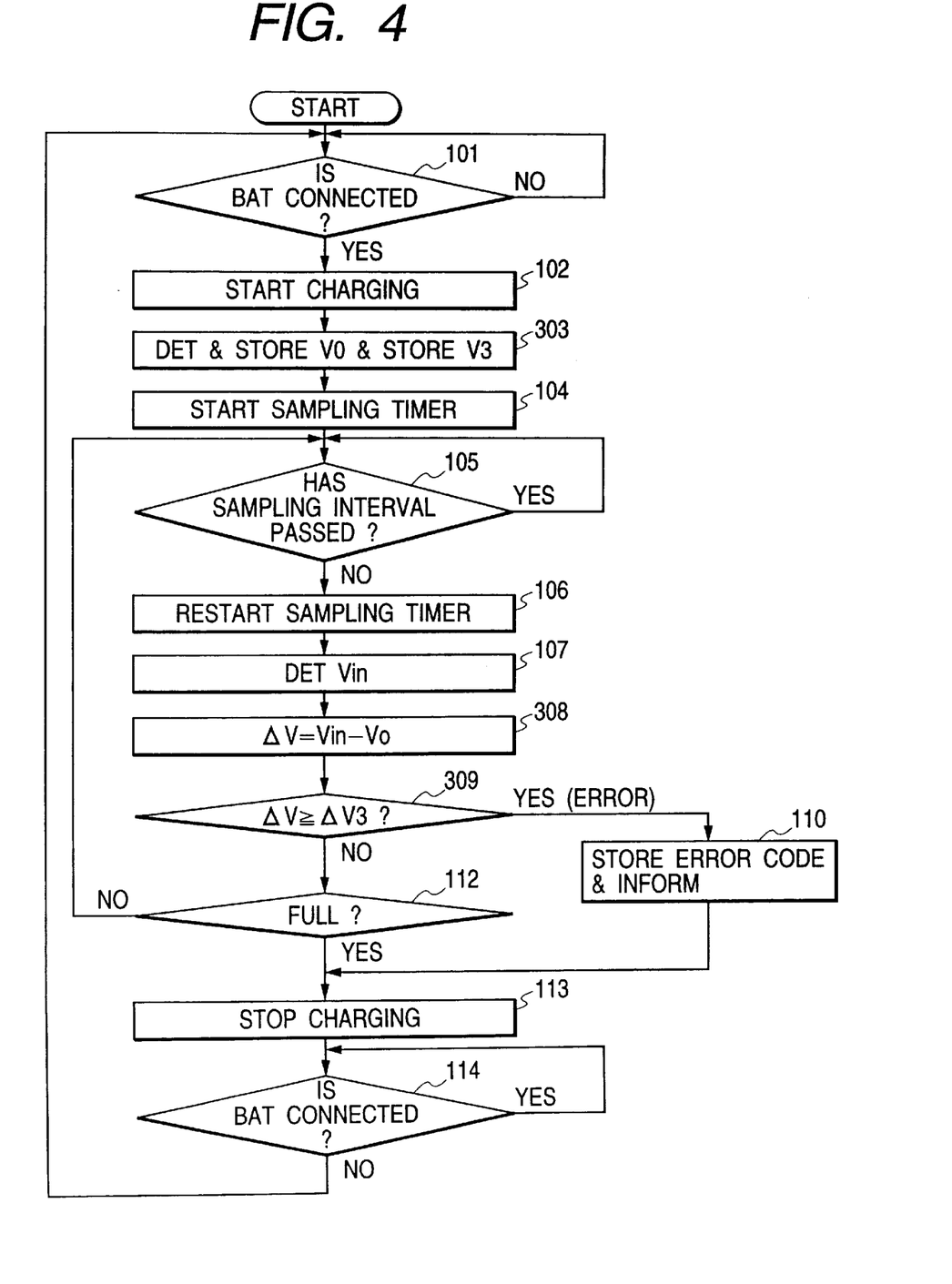
FIG. 4 depicts a flow chart showing the operation of a third embodiment.

FIG. 4 depicts a flow chart showing an operation of a battery charging apparatus of a third embodiment.

The structure of the third embodiment is substantially the same as that of the first embodiment. The difference is that $\Delta V$ is detected between the presently sampled temperature detection signal Vin and the starting voltage V0 of the temperature detection signal. That is, step 111 in FIG. 2 is omitted and steps 303, 308, 309 respectively replace steps 103, 108, and 109 in FIG. 2.

In response to the resetting circuit 75, the microprocessor 50 initializes the output port 56 and waits for connection of the battery package 2 in step 101.

When the battery package 2 is set, the microprocessor 50 starts charging in step 102 by setting a charging current reference value VI to the amplifier 62 to charge the battery package 2 at a charging current I. The charging current control circuit 60 obtains the difference between the value of the charging current from the charging current detection resistor 3 and the charging current reference value VI and supplies it as feedback to the PWM control circuit 23. That is, when the detected charging current is higher than the charging reference value VI, the pulse width is relatively shortened by PWM circuit 23 and when the charging current is lower than the charging reference value VI, the pulse width is made relatively long by the PWM circuit 23 to keep the charging current constant.

Then, the microprocessor 50 detects the temperature detection signal Vin and stores it as the starting voltage V0 in the RAM 53 and stores a predetermined value ΔV3 to be compared with the sampled temperature detection signal Vin in step 303. In step 104, the microprocessor 50 starts the timer 54 as the sampling timer. Then, the microprocessor 50 checks the sampling timer 54 to Judge whether the sampling interval Δt has passed. If the sampling interval Δt has passed, the microprocessor 50, restarts the sampling timer 54 in step 106. The microprocessor 50 detects the temperature detection signal Vin in step 107. The microprocessor 50 obtains a difference ΔV between the temperature detection signal Vin and the start voltage V0 of the temperature detection signal in step 308.

The microprocessor 50 compares the difference ΔV with the predetermined value ΔV3 in step 309. If the difference ΔV is equal to or higher than the predetermined value ΔV3, the microprocessor 50 stores the corresponding error code and alarms and informs the operator of the error condition by the alarming circuit 94 in step 110. The error code may be outputted at an output 95. Then, the microprocessor 50 controls the switching circuit 20 to stop charging in step 113. In the following step 114, the microprocessor 50 detects whether the battery package 2 is connected. If the battery package 2 is removed, processing returns to step 101.

In step 309, if the difference ΔV is lower than the predetermined value ΔV3, the microprocessor 50 judges whether the batteries 2e have been fully charged. If the batteries 2e is not fully charged, processing returns to step 105.

In step 112, if the batteries 2e have been fully charged, the microprocessor 50 controls the switching circuit 20 to stop charging in step 113 by controlling the PWM circuit 23. In the following step 114, the microprocessor 50 detects whether the battery package 2 is disconnected. If the battery package 2 is removed, processing returns to step 101.

Fourth Embodiment

Figure 6:
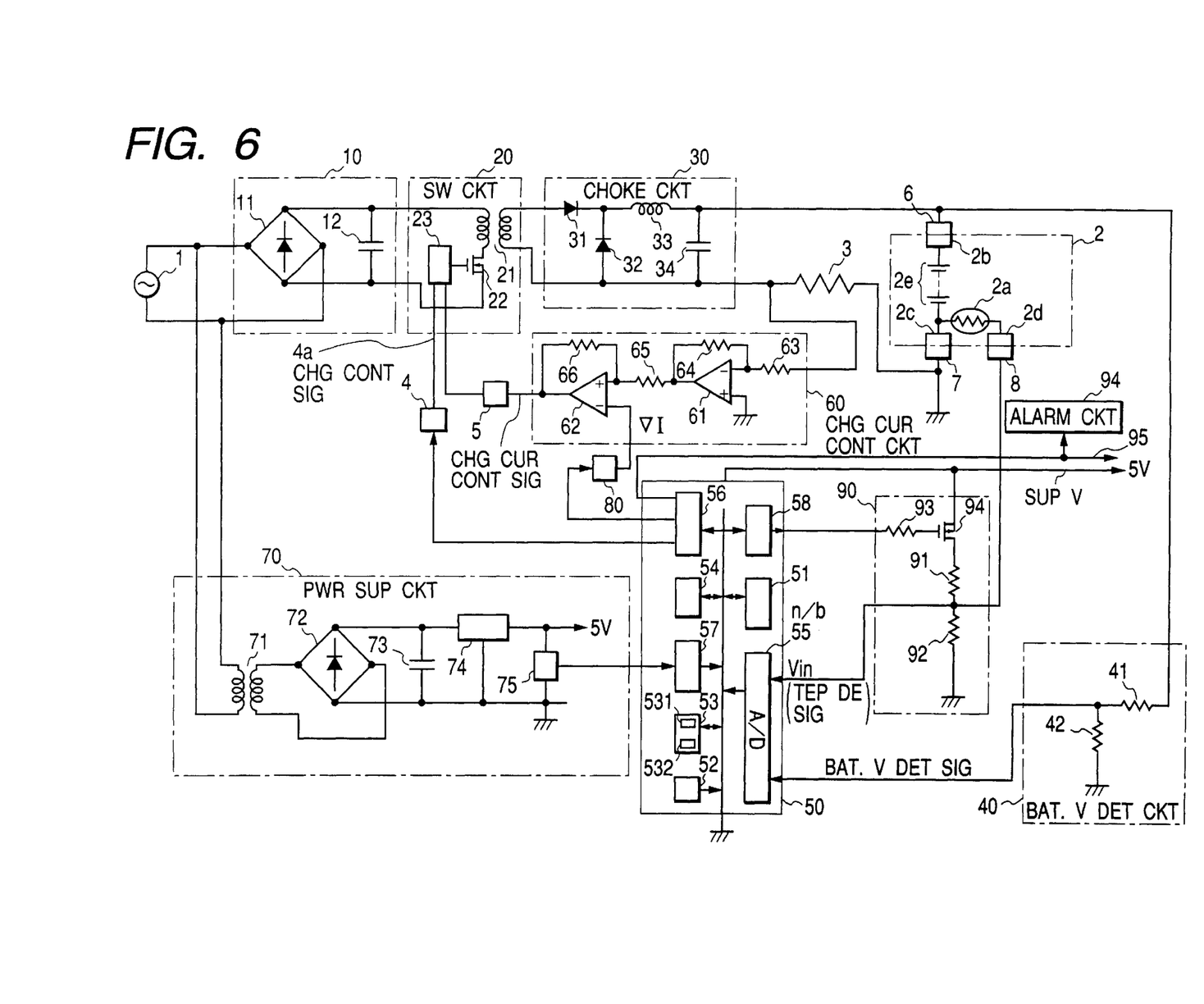
FIG. 6 is a block diagram of a battery charging apparatus of a fourth embodiment.

FIG. 6 is a block diagram of a battery charging apparatus of a fourth embodiment.

Figure 7:
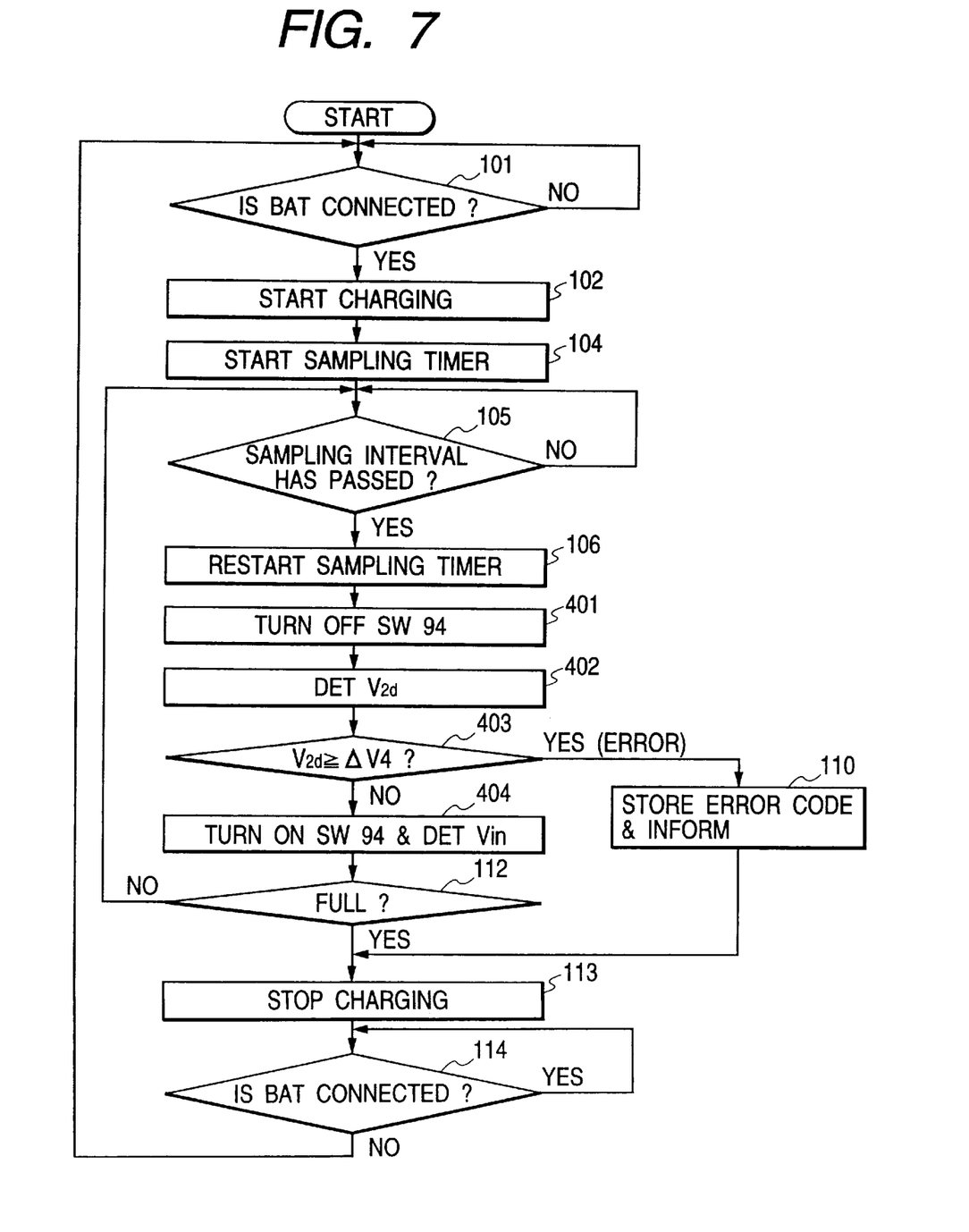
FIG. 7 depicts a flow chart showing the operation of the battery charging apparatus of the fourth embodiment.

FIG. 7 depicts a flow chart showing an operation of the battery charging apparatus of the fourth embodiment.

The structure of the fourth embodiment is substantially the same as that of the first embodiment. The difference is that a switch 94 supplying the power supply of five volts to the resistor 91 and an output port 58 in the microprocessor 50 is used for controlling the switch 94 through a resistor 93 and the operation by the microprocessor 50 is different as shown in FIG. 7.

The switch 94 supplies the supply power of five volts to the thermistor 2a through the resistor 91 during detecting of the temperature signal. However, while the microprocessor 50 detects the error condition due to voltage leakage from the positive terminal of the battery 2e to the terminal 2d through the leaked electrolyte from the battery 2e due to charging, the switch 94 is turned off to stop supplying the supply power to the thermistor 2a. If there is no leakage, the voltage at the terminal 2d is almost zero volts. However, if there is leakage from battery 2e and there is short between the terminals 2b and 2d, the voltage of the terminal 2e is not zero volts.

In response to the resetting circuit 75, the microprocessor 50 initializes the output port 56 and waits for connection of the battery package 2 in step 101.

When the battery package 2 is connected, the microprocessor 50 starts charging in step 102 by setting a charging current reference value VI to the amplifier 62 to charge the battery package 2 at a charging current I. The charging current control circuit 60 obtains the difference between the value of the charging current from the charging current detection resistor 3 and the charging current reference value VI and supplies it as feedback to the PWM control circuit 23. That is, when the detected charging current is higher than the charging reference value VI, the pulse width is relatively shortened by PWM circuit 23 and when the charging current is lower than the charging reference value VI, the pulse width is made relatively long by the PWM circuit 23 to keep the charging current constant.

Then, in step 104, the microprocessor 50 starts the timer 54 as the sampling timer. Then, the microprocessor 50 checks the sampling timer 54 to judge whether the sampling interval Δt has passed. If the sampling interval Δt has passed, the microprocessor 50, restarts the sampling timer 54 in step 106.

The microprocessor 50 turns off the switch 94 with the output port 58 in step 401. The microprocessor 50 detects the voltage V2d at the terminal 2d using the battery temperature detection circuit 90 and the a/d converter 55 in step 402.

The microprocessor 50 compares the voltage V2d at the terminal 2d with the predetermined value V4 in step 403. If the voltage V2d at the terminal 2d is equal to or higher than the predetermined value V4, the microprocessor 50 stores the corresponding error code and informs the operator of the error condition, that is, there is leakage of electrolyte from the battery 2e, by the alarming circuit 94 in step 110. The error code may be outputted at an output 95. Then, the microprocessor 50 controls the switching circuit 20 to stop charging in step 113. In the following step 114, the microprocessor 50 detects whether the battery package 2 is connected. If the battery package 2 is removed, processing returns to step 101.

In step 403, if the voltage V2d at the terminal 2d is lower than the predetermined value V4, that is, the answer is NO, the microprocessor 50 turns on the switch 94 and detects the voltage of the temperature detection signal Vin with the battery temperature detection circuit and the a/d converter as similar to the first embodiment.

In the following step 112, the microprocessor 50 judges whether the batteries 2e have been fully charged with the voltage of the temperature detection signal Vin. If the batteries 2e is not fully charged, processing returns to step 105.

In step 112, if the batteries 2e have been fully charged, the microprocessor 50 controls the switching circuit 20 to stop charging in step 113 by controlling the PWM circuit 23. In the following step 114, the microprocessor 50 detects whether the battery package 2 is disconnected. If the battery package 2 is removed, processing returns to step 101.

Figure 8:
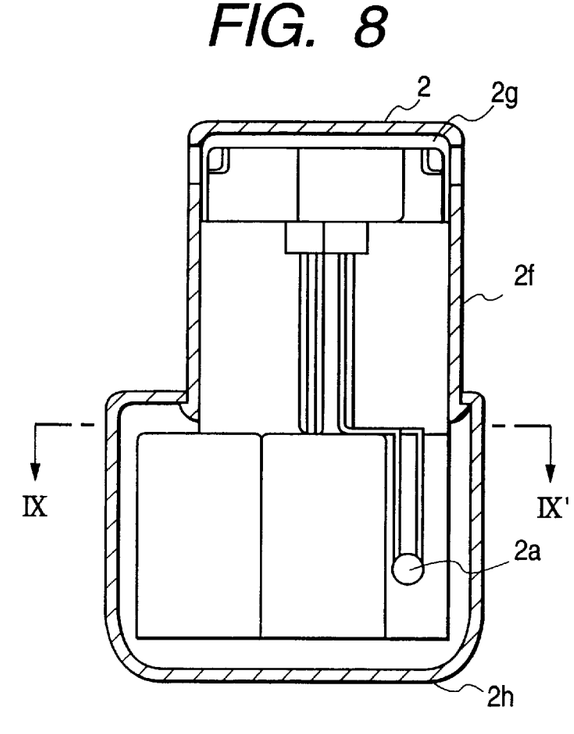
FIG. 8 is a front cross-sectional view of the battery package of this invention.
Figure 9:
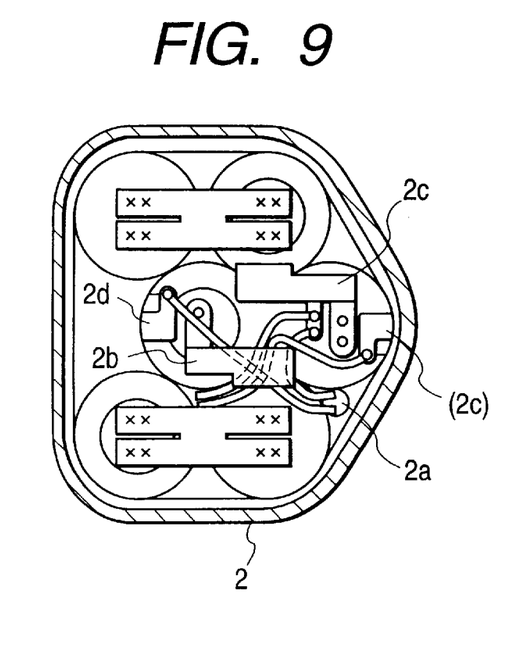
FIG. 9 is a cross-sectional plan view of the battery package of this invention, wherein a cap of the battery package is removed.

FIG. 8 is a front cross-sectional view of the battery package 2 used in the above-mentioned embodiments. FIG. 9 is a cross-sectional plan view of the battery package 2 used in the above-mentioned embodiments, wherein a cap 2f of the battery package 2 is removed. The terminals 2b, 2c, and 2d are provided at the top 2g of the battery package in FIG. 8. The top 2g of the battery package 2 is arranged with the top 2g at a lower position than a bottom 2h in the battery charging apparatus during charging, so that if there is leakage of electrolyte from the battery 2e, the leaked electrolyte exists between the terminal 2b and 2d, which causes leakage of the charging current or the battery voltage to the terminal 2d. This arrangement is provided to detect the leakage of the electrolyte.

What is claimed is:

1. A battery charging apparatus comprising:

charging current generation means for generating a charging current from an ac supply;

first terminal means for supplying said charging current to a secondary battery to be charged included in a battery package, said battery package further including a thermal sensitive element adjacent to said secondary battery generating a temperature detection signal indicative of a temperature of said battery;

second terminal means for receiving said temperature detection signal;

sampling means for periodically sampling a value of said temperature detection signal every predetermined interval;

memory means responsive to said sampling means for storing said value;

operation means for obtaining a temperature decrease value from said value and said value from said memory means;

error judgment means for judging an error condition when said difference is higher than a predetermined value; and control means for controlling said charging current generation means to stop generating said charging current when said temperature decrease value is higher than a predetermined value.

2. The battery charging apparatus as claimed in claim 1, further comprising alarming means responsive to said error judging means for alarming and informing an operator of said error condition when said difference is higher than said predetermined value.

3. The battery charging apparatus as claimed in claim 1, wherein said operation means obtains said difference between said value and said value one-cycle-previously-sampled value from said memory means.

4. The battery charging apparatus as claimed in claim 1, further comprising minimum value detection means for detecting a minimum value of periodically sampled values using said memory means, and said operation means obtains said difference between said value and said minimum value.

5. The battery charging apparatus as claimed in claim 1, wherein said memory is further responsive to said charging current generation means and stores said value as a start value in response to start of generation of said charging current, and said operation means obtains said difference between said value and said start value.

6. A battery charging apparatus comprising:

charging current generation means for generating a charging current from an ac supply;

first terminal means for supplying said charging current to a secondary battery to be charged included in a battery package, said battery package further including a thermal sensitive element adjacent to said secondary battery generating a temperature detection signal indicative of a temperature of said battery;

second terminal means for receiving said temperature detection signal;

charging control means for controlling said charging current generation means in accordance with said temperature detection signal;

switching means connected to said second terminal means for periodically supplying a sampling voltage for generating said temperature detection signal through a resistor to said thermal sensitive element; and error detection means for turning off said switching means and detecting a voltage at said second terminal when said switching means is turned off which may be developed by charging said secondary battery, comparing said voltage with a predetermined value, judging an error condition when said voltage is higher than said predetermined value and controlling said charging current generation means to stop generating said charging current when said voltage is higher than said predetermined value.

7. The battery charging apparatus as claimed in claim 6, wherein further comprising alarming means responsive to said error detection means for alarming and informing an operator of said error condition when said voltage is higher than said predetermined value.

* * * * *